United States Patent
Kwon et al.

(10) Patent No.: US 7,298,085 B2
(45) Date of Patent: Nov. 20, 2007

(54) COMPOSITION OF GLASS FOR PLASMA DISPLAY PANEL AND FABRICATION METHOD THEREOF

(75) Inventors: Tae In Kwon, Seoul (KR); Byung Gil Ryu, Seoul (KR); Won Seok Moon, Seoul (KR); Sung Wook Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/740,502

(22) Filed: Dec. 22, 2003

(65) Prior Publication Data

US 2005/0029938 A1 Feb. 10, 2005

(30) Foreign Application Priority Data

Aug. 4, 2003 (KR) ............. 10-2003-0053824

(51) Int. Cl.
*H01J 17/49* (2006.01)
(52) U.S. Cl. .................... 313/582; 501/32
(58) Field of Classification Search ........ 313/582–587; 501/32, 64, 72, 74
See application file for complete search history.

(56) References Cited

U.S. PATENT DOCUMENTS 5,838,106 A 11/1998 Funada ............ 313/587
6,242,859 B1 6/2001 Betsui et al. ............ 313/584
6,599,851 B1 7/2003 Ryu ............. 501/22
6,617,789 B2 * 9/2003 Onoda et al. ............ 313/586
2002/0052287 A1 5/2002 Morita et al.
2003/0108753 A1 6/2003 Fujii et al.

FOREIGN PATENT DOCUMENTS

| EP | 1006088 | 11/1999 |
| EP | 1122220 | 1/2001 |
| JP | 7291656 | 7/1995 |
| JP | 2000128574 | 5/2000 |
| JP | 2001048577 | 2/2001 |
| JP | 2001139345 | 5/2001 |
| JP | 20001139345 | 5/2001 |
| JP | 2003128430 | 5/2003 |
| KR | 97-705163 | 9/1997 |
| WO | 00/73228 | 12/2000 |

OTHER PUBLICATIONS

Korean Office Action (May 26, 2005).

* cited by examiner

*Primary Examiner*—Joseph Williams
(74) *Attorney, Agent, or Firm*—KED & Associates, LLP

(57) ABSTRACT

A glass composition for a plasma display panel (PDP) and its fabrication method are disclosed. The composition, including a $ZnO$—$B_2O_3$ group and alkaline earth metal oxide, is environment-friendly, has a high discharge efficiency and is used as various PDP dielectric materials. The fabrication method allows to compose the low melting point unleaded non-alkali glass composition at a low cost.

10 Claims, 2 Drawing Sheets

| | EMBODIMENTS | | | | | | |
|---|---|---|---|---|---|---|---|
| | 1ST | 2ND | 3TH | 4TH | 5TH | 6TH | 7TH |
| ZnO | 30mol% | 30mol% | 30mol% | 26mol% | 33mol% | 34mol% | 32mol% |
| $B_2O_3$ | 40mol% | 40mol% | 40mol% | 43mol% | 36mol% | 37mol% | 37mol% |
| RO (BaO,CaO,SrO,MgO) | 25mol% | 30mol% | 25mol% | 20mol% | 18mol% | 25mol% | 13mol% |
| $La_2O_3$, $Al_2O_3$, $SiO_2$ | 5mol% | - | 5mol% | 4mol% | 6mol% | 5mol% | 6mol% |
| $Bi_2O_3$ | - | - | - | 8mol% | 7mol% | - | 9mol% |
| TRANSITION POINT (°C) | 547 | 522 | 514 | 494 | 482 | 538 | 500 |
| THERMAL EXPANSION COEFFICIENT ($\times 10^{-7}$/°C) | - | 94 | 87 | 90 | 89 | 79 | 75 |
| DIELECTRIC CONSTANT | 8~13 | | | | | | |

| EMBODIMENTS | | | | | | | |
|---|---|---|---|---|---|---|---|
|  | 1ST | 2ND | 3TH | 4TH | 5TH | 6TH | 7TH |
| ZnO | 30mol% | 30mol% | 30mol% | 26mol% | 33mol% | 34mol% | 32mol% |
| $B_2O_3$ | 40mol% | 40mol% | 40mol% | 43mol% | 36mol% | 37mol% | 37mol% |
| RO (BaO,CaO,SrO,MgO) | 25mol% | 30mol% | 25mol% | 20mol% | 18mol% | 25mol% | 13mol% |
| $La_2O_3, Al_2O_3, SiO_2$ | 5mol% | - | 5mol% | 4mol% | 6mol% | 5mol% | 6mol% |
| $Bi_2O_3$ | - | - | - | 8mol% | 7mol% | - | 9mol% |
| TRANSITION POINT (°C) | 547 | 522 | 514 | 494 | 482 | 538 | 500 |
| THERMAL EXPANSION COEFFICIENT ($\times 10^{-7}$/°C) | - | 94 | 87 | 90 | 89 | 79 | 75 |
| DIELECTRIC CONSTANT | 8~13 | | | | | | |

COMPOSITION OF GLASS FOR PLASMA DISPLAY PANEL AND FABRICATION METHOD THEREOF

BACKGROUND OF THE INVENTION

1. Field of the Invention

The present invention relates to a plasma display panel (PDP) and, more particularly, to a composition of glass for PDP and its fabrication method.

2. Description of the Background Art

In general, a plasma display panel (PDP) device receives much attention as a next-generation display device together with a thin film transistor (TFT), a liquid crystal display (LCD), an EL (Electro-Luminescence) device, an FED (Field Emission Display) and the like.

The PDP is a display device using a luminescent phenomenon according to an energy difference made when red, green and blue fluorescent materials are changed from an excited state to a ground state after being excited by 147 nm of ultraviolet rays which are generated as a He+X3 gas or N3+X3 gas is discharged from a discharge cell isolated by a barrier rib.

Thanks to its properties of facilitation in manufacturing from a simple structure, a high luminance, a high light emitting efficiency, a memory function, a high non-linearity, a 160° or more optical angular field and the like, the PDP display device is anticipated to occupy large-scale display device markets.

A structure of the conventional PDP will now be described with reference to FIG. 1.

FIG. 1 is a sectional view showing a structure of a conventional PDP.

As shown in FIG. 1, the conventional PDP includes: a lower insulation layer 20 formed on a lower glass substrate 21; an address electrode 22 formed at a predetermined portion on the lower insulation layer 20; a lower dielectric layer 19 formed on the address electrode 22 and the lower insulation layer 20; an isolation wall 17 defined in a predetermined portion on the lower dielectric layer 19 in order to divide each discharging cell; a black matrix layer 23 formed on the isolation wall 17; a fluorescent layer 18 formed with a predetermined thickness on the side of the black matrix layer 23 and the isolation wall 17 and on the lower dielectric layer 19, and receiving ultraviolet ray and emitting each red, green and blue visible rays; a glass substrate 11; a sustain electrode 12 formed at a predetermined portion on the upper glass substrate 11 in a manner of vertically intersecting the address electrode 22; a bus electrode 13 formed on a predetermined portion on the sustain electrode 12; an upper dielectric layer 14 formed on the bus electrode 13, the sustain electrode 12 and the upper glass substrate 11; and a protection layer (MgO) 15 formed on the second upper dielectric layer 14 in order to protect the upper dielectric layer 14.

The operation of the conventional PDP will now be described.

First, as the upper glass substrate 11 and the lower glass substrate 21 of the conventional PDP, an SLS (Soda-Lime Silicate) glass substrate is used.

The lower insulation layer 20 is positioned on the lower glass substrate 21, the SLS glass substrate, and the address electrode 22 is positioned on the lower insulation layer 20.

The lower dielectric layer 19 positioned on the address electrode 22 and the lower insulation layer 20 blocks visible rays emitted toward the lower glass substrate 21.

In order to increase the luminous efficacy, a dielectric layer having a high reflectance is used as the lower dielectric layer 19. The lower dielectric layer 19, a translucent dielectric layer with a reflectance of 60% or above, minimizes loss of light.

The fluorescent layer 18 is formed by laminating in a sequential order of red, green and blue phosphor materials. A specific wavelength of visible ray is emitted depending on an intensity of an ultraviolet ray according to plasma generated between the isolation walls 17.

Meanwhile, at a lower surface of the upper glass substrate 11, the SLS glass substrate, there are formed the sustain electrode 12 positioned to vertically intersect the address electrode 22 and the bus electrode 13 positioned on the sustain electrode 12. And upper dielectric layer having an excellent light transmittance is positioned on the bus electrode 13.

The protection layer 15 is positioned on the upper dielectric layer 14 in order to prevent the upper dielectric layer 14 from being damaged due to generation of plasma. Herein, since the upper dielectric layer 14 is directly contacted with the sustain electrode 12 and the bus electrode 13, it must have a high softening temperature in order to avoid a chemical reaction with the sustain electrode 12 and the bus electrode 13.

Thereafter, as the upper plates 11~15 and the lower plates 19~22 are bonded by a seal material 16, a PDP is completely formed.

Of the formed structures, the isolation wall 17, the lower dielectric layer 19, the upper dielectric layer 14, the seal material 16 are glass compositions containing a large amount of Pb.

In addition, the fabrication process of the isolation wall 17, the lower dielectric layer 19, the upper dielectric layer 14 and the seal material 16 may have a vital influence on a human body.

Moreover, discarding of the glass composition may cause an environmental pollution.

Especially, as the move of regulating use of materials detrimental to the human body and the environment is becoming more active worldwide, development of an unleaded dielectric materials that may substitute the dielectric of the PDP containing a large volume of Pb is actively made.

The conventional unleaded glass composition includes alkali metal-oxide to lower a softening temperature of glass, but there has been reported that movement of alkali metal ion during discharging makes a bad influence on the discharge characteristics.

In an effort to solve the problem of the unleaded glass composition containing the alkali metal-oxide, an unleaded non-alkali dielectric comprising $ZnO$—$B_2O_3$—$BaO$ has been proposed, which, however, has a problem that a glass structure is so unstable that a transition point of glass contained in the unleaded non-alkali dielectric is too high or a phase separation of glass occurs.

In addition, in order to drop the softening temperature, the amount of $Bi_2O_3$ is added by 60~50 wt %, but in this case, a problem arises that a cost of the dielectric material is increased due to the high-priced $Bi_2O_3$ and a luminous efficacy is degraded as a discharge current is increased due to the high electric pemittivity.

Other conventional PDPs and their fabrication methods are disclosed in the U.S. Pat. No. 5,838,106 issued on Nov. 17, 1998, a U.S. Pat. No. 6,242,859 issued on Jun. 5, 2001, and a U.S. Pat. No. 6,599,851 issued on Jul. 29, 2003.

As stated above, the glass composition used for the PDP in accordance with the conventional art has the following problems.

That is, first, the glass composition includes a large amount of Pb which is critical to the human body and the environment, and the unleaded glass composition adopting the alkali metal-oxide intended not to use Pb has such degraded discharge characteristics.

Second, the glass composition having $ZnO$—$B_2O_3$—$BaO$ as a primary component, which is proposed as an unleaded non-alkali dielectric has a high softening temperature, causes a phase separation, and has an unstable glass structure.

Third, since the large amount of $Bi_2O_3$ is contained in the glass composition to lower the softening temperature, the fabrication cost of the glass composition is increased, and the electric permittivity of glass is so high that the luminous efficacy is degraded.

SUMMARY OF THE INVENTION

Therefore, one object of the present invention is to provide a glass composition of a plasma display panel (PDP) which is environment-friendly, has a high discharge efficiency and is used as various PDP dielectric materials, and its fabrication method.

Another object of the present invention is to provide a low melting point unleaded non-alkali glass composition for a PDP which can be prepared at a low cost, and its fabrication method.

To achieve these and other advantages and in accordance with the purpose of the present invention, as embodied and broadly described herein, there is provided a glass composition of a PDP comprises $ZnO$—$B_2O_3$ group and alkaline earth metal oxide.

To achieve the above objects, there is also provided a glass composition of a PDP comprising: 10~40 mol % of ZnO and $B_2O_3$ each having a ratio of 0.5~1.5, 10~24 mol % of alkaline earth metal oxide, 15 mol % or less $Bi_2O_3$, and 10 mol % or less additive for heightening a glass durability and preventing crystallization.

To achieve the above objects, there is also provided a method for fabricating a glass composition of a PDP, including: mixing 10~40 mol % of ZnO, 10~40 mol % $B_2O_3$, 10~25 mol % of alkaline earth metal oxide and 15 mol % or less $Bi_2O_3$; and melting the mixture at a high temperature, quenching the melted component to form a glass flake, milling the glass flake to form unleaded non-alkali glass powder.

The ratio of ZnO and $B_2O_3$ is 0.5~1.5.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
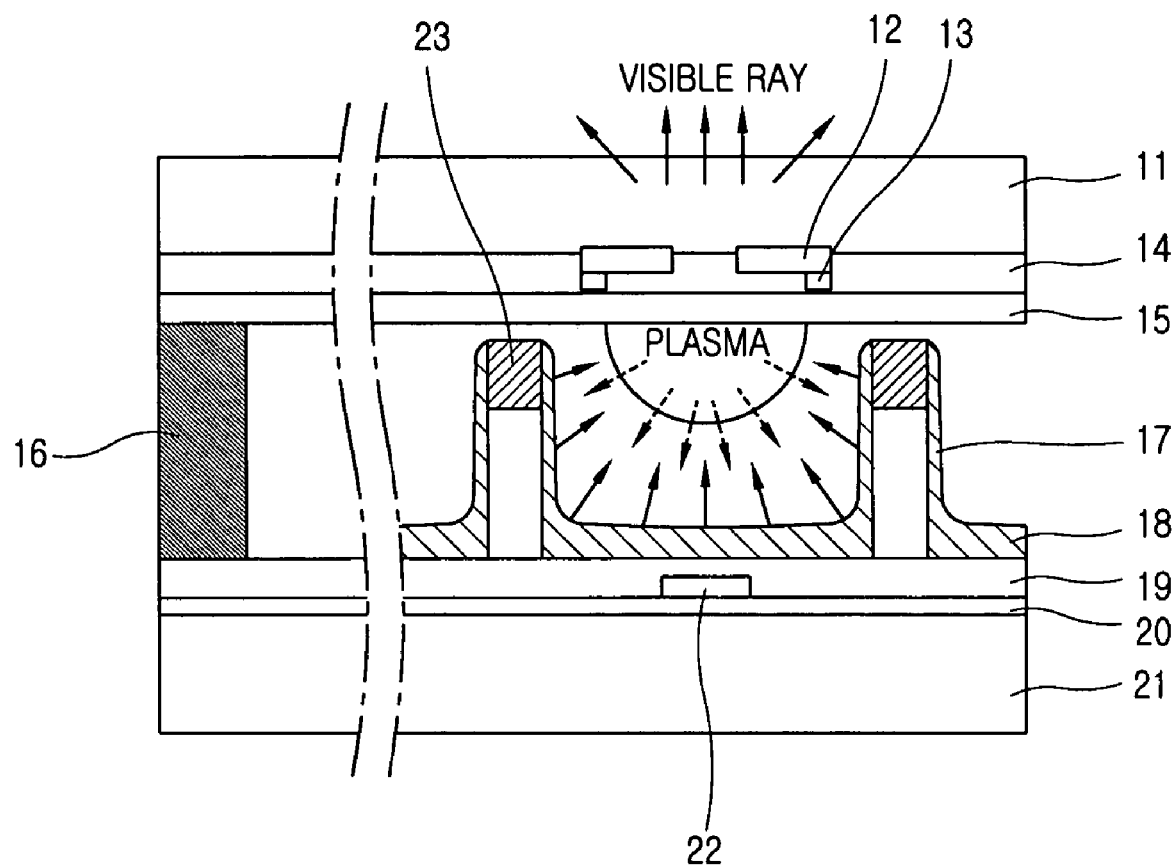
FIG. 1 is a sectional view showing a structure of a PDP in accordance with a conventional art.

Reference will now be made in detail to the preferred embodiments of the present invention, examples of which are illustrated in the accompanying drawings.

A glass composition for a PDP and its fabrication method, by which a ZnO-B2O3 group and alkaline earth metal oxide are composed to be environment-friendly, to have a high discharge efficiency and to be used for various PDP dielectric materials, said glass composition being a low melting point unleaded non-alkali glass composition which can be formed at a low cost, in accordance with preferred embodiments of the present invention will now be described with reference to FIGS. 2 and 3.

First, the glass composition, the low melting point unleaded non-alkali glass composition, in accordance with the present invention can be used for an isolation wall, a lower dielectric layer, an upper dielectric layer and a seal material of a PDP, with a high discharge efficiency, and can be fabricated at a low cost.

The glass composition of the present invention contains 10~40 mol % of ZnO, 10~40 mol % of $B_2O_3$, and 10~25 mol % of alkaline earth metal oxide (RO) (BaO, SrO, CaO and MgO) as primary components.

In addition, in order to lower the glass transition point, a small amount of, that is, 1~15 mol %, comparatively high-priced $Bi_2O_3$ is added. A small amount of additive ($La_2O_3$, $Al_2O_3$, $SiO_2$) in the range of 0~10 mol % is added to heighten a glass durability and prevent crystallization.

The $ZnO$—$B_2O_3$ group, alkaline earth metal oxide, $Bi_2O_3$, and additives will now be described in sequence. The $ZnO$—$B_2O_3$ group and the alkaline earth metal oxide are essential elements of the glass composition of the present invention, and $Bi_2O_3$ and additives can be contained in or excluded from the glass composition.

ZnO and $B_2O_3$

The present invention uses ZnO and $B_2O_3$, the primary component used for forming unleaded non-alkali dielectric as in the conventional art, but an addition ratio of ZnO and $B_2O_3$ is limited. That is, in the present invention, the ratio of Zn and $B_2O_3$ is limited to be 0.5~1.5. The reason is because if $B_2O_3$ is excessively added in the glass composition, a glass transition point rises too high while if ZnO is excessively added in the glass composition, the glass composition would be easily crystallized. Preferably, ZnO and $B_2O_3$ are added by 10~40 mol %, respectively, to the glass composition.

Alkaline-Earth Metal Oxide

In order to lower the transition point, 10~25 mol % of alkaline-earth metal oxide (RO) is added to the glass composition. Preferably, the alkaline-earth metal oxide can be BaO, SrO, CaO, MgO, or their mixture. BaO is the most effective to lower the transition point, and SrO, CaO and MgO in sequential order. However, if the alkaline-earth metal oxide is excessively added to the glass composition, a thermal expansion coefficient is increased, and especially, if MgO is excessively added to the glass composition, crystallization would be easily made. Therefore, it is preferred that one of BaO, SrO, CaO and MgO or their mixture is added by 10~25% to the glass composition.

$Bi_2O_3$

In order to lower the glass transition point, a small amount of, that is, 1~15 mol %, $Bi_2O_3$ is added to the glass composition. $Bi_2O_3$ is limited in the range of about 1~15 mol % to restrain increasing of the dielectric constant (that is, permittivity). For example, if $Bi_2O_3$ is added beyond the range limited in the present invention to the glass composition and then used as an upper dielectric of the PDP, the dielectric constant of the upper dielectric would increase, resulting in that a luminous efficacy would decrease due to the increase in the discharge current.

Referring back to the conventional art, $Bi_2O_3$ has a high percentage, accounting for 60~80 wt % of overall glass composition, so such a big problem arises that the dielectric constant as well as its cost increases. However, compared to the conventional art, in the present invention, the use amount of $Bi_2O_3$ is considerably reduced to restrain increase of the dielectric constant, whereby the luminous efficacy can be improved and at the same time a fabrication cost can be reduced.

Additive

The additive adopted for the glass composition of the present invention includes $La_2O_3$, $Al_2O_3$ and $SiO_2$.

$Al_2O_3$ serves to enhance a glass durability and lower a thermal expansion coefficient, and especially, it helps prevent crystallization of glass.

$SiO_2$ increases a mechanical strength and lowers the thermal expansion coefficient, but too much addition of $SiO_2$ would increase the glass transition point, so only a small amount of $SiO_2$ is used.

Preferably, one of the additives or their mixture is added by 0~10 mol % to the glass composition.

Characteristics of the unleaded dielectric made of the glass composition for a PDP in accordance with the present invention will now be described in detail with reference to FIG. 2.

Figures 2, 3:
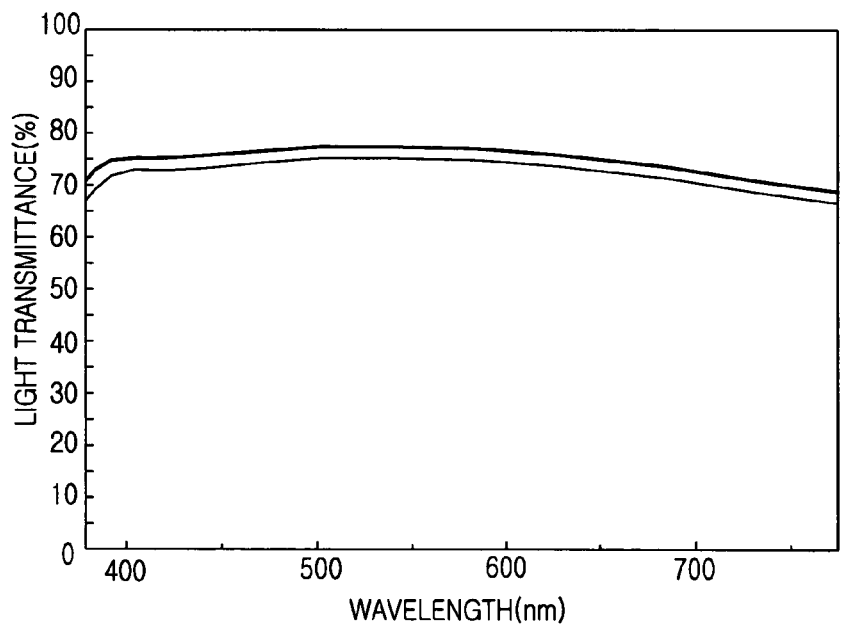
FIG. 2 is a table showing a result of measurement of glass compositions after forming composition ratios of glass compositions for a PDP through seven embodiments in accordance with the present invention.
FIG. 3 is a graph showing a transmittivity of an unleaded non-alkali upper dielectric layer formed with the glass composition in accordance with the present invention.

FIG. 2 is a table showing a result of measurement of glass compositions after forming composition ratios of glass compositions for a PDP through seven embodiments in accordance with the present invention.

It is noted that the result of measurement of glass compositions according to each embodiment shows that characteristics of the glass composition of the present invention is suitable for the glass composition for a PDP.

There can be various methods for forming glass compositions with components according to each embodiment.

In the present invention, after glass powder is formed with components according to each embodiment, the glass powder is coated as a thin film on a SLS (Soda-Lime Silicate) glass substrate by a screen printing method, and then, the coated thin film is fired to form an unleaded upper dielectric. The result shows measurement of the characteristics of the upper dielectric.

With reference to FIG. 2, transition pints of unleaded upper dielectrics formed according to each embodiment are in the range of 480° C.~550° C., thermal expansion coefficients are 70~95×10-7/° C., and dielectric constants are 8~13, which confirm that the unleaded upper dielectrics exhibit excellent characteristics as a dielectric material of the PDP. Herein, the transition point and the thermal expansion coefficient, the characteristics of the unleaded upper dielectrics formed according to each embodiment, were measured by processing the unleaded upper dielectric to 10 mm×1 mm×1 mm and measuring the processed unleaded upper dielectric with an equipment of Netzsch TMA 402, and the thermal expansion coefficient was obtained in the temperature range of 50° C.~350° C.

A method for preparing the glass composition for a PDP and a method for fabricating the unleaded dielectric by using the glass composition will now be described in detail.

The method for preparing the glass composition for a PDP includes: mixing 10~50 mol % of ZnO, 10~40 mol % of $B_2O_3$, 10~25 mol % of alkaline earth metal oxide and 15 mol % or less $Bi_2O_3$; and melting the mixture at a high temperature, quenching the melted component to form a glass flake, and milling the glass flake to form unleaded non-alkali glass powder. The ratio of ZnO and $B_2O_3$ is 0.5~1.5.

First, components according to each embodiment are weighed as much as a pre-set amount and mixed, the mixture is put in a platinum crucible and melt at 1000° C.~1300° C. in an electric furnace for 1~2 hours, and then the melted component is quenched to form a glass flake.

The glass flake is milled with a ball mill to crush fine to create glass powder. As the milling process for forming the glass powder, a dry milling process and a wet milling process are all available, and preferably, the dry milling process is used.

For example, when the glass powder is formed by the wet milling process, hydroxy (OH) group is adsorbed to the finely crushed glass surface, so that when a thin film is fired, air bubbles are formed in the thin film. That is, when the thin film formed through the wet milling process is fabricated to an upper dielectric, a transmittivity of the upper dielectric is degraded. Therefore, the glass powder is preferably formed through the dry milling process, and an average particle diameter of the mile glass powder is preferably 1~4 µm.

Thereafter, the milled glass powder is mixed in an organic vehicle consisting of a solvent (e.g., butyl carbitol acetate, butyl carbitol), a binder (e.g., ethyl cellulose) and a plasticizer (e.g., dibutyl phthalate (DBP)) to form a paste, the paste is coated as a thin film on the SLS glass substrate by a screen printing method, the coated thin film is dried at a temperature of 120° C., and then fired at 560° C. 590° C. for 10~30 minutes, thereby forming an unleaded upper dielectric.

In the present invention, after the glass composition is made to the paste, the paste is fabricated to the unleaded upper dielectric for a PDP through the printing process, but the unleaded upper dielectric can be formed in various ways such as a green sheet laminating, die coater, doctor blade, and the like.

Especially, when forming the isolation wall by using the glass composition in accordance with the present invention, the isolation wall can be formed through a photosensitivity paste method, a press molding method and a rift-off method.

The transmittivity curves of the unleaded of the unleaded non-alkali upper dielectrics formed with a thickness of 30 µm on the 2.7 mm SLS glass substrate according to each embodiment as shown in FIG. 2 will now be described with reference to FIG. 3.

FIG. 3 is a graph showing a transmittivity of an unleaded non-alkali upper dielectric layer formed with the glass composition in accordance with the present invention.

In this drawing, the transmittivity of the unleaded non-alkali upper dielectric layer is 75% or more of the overall visible ray region, and the transmittivity curve confirms that the glass compositions according to the embodiments of the present invention are suitable for the transparent dielectric material.

FIG. 3 shows a transmittivity curve of the unleaded non-alkali upper dielectric layer in accordance with the fourth, fifth and seventh embodiments of the present invention, from which it is noted that the each transmittivity of the dielectric layers of the fourth, fifth and seventh embodiments is excellent compared to the other embodiments.

Each glass composition according to each embodiment can be made to glass powder through a dry milling process after melting and quenching process, so that the glass composition can be easily applied to various processes and used as an isolation wall of the PDP, an upper dielectric layer, a lower dielectric layer, a seal material, and the like. Especially, mixing the glass composition to a ceramic filler ($TiO_2$ or $Al_2O_3$) can form the unleaded non-alkali isolation wall dielectric or unleaded non-alkali lower dielectric, whereby all the dielectric materials for a PDP can be made to unleaded and non-alkali.

In fabricating the upper dielectric layer by using the unleaded non-alkali glass composition as a dielectric material, the thickness of the upper dielectric layer is preferably 25~40 μm.

In fabricating the lower dielectric layer by using the unleaded non-alkali glass composition as a dielectric material, the thickness of the upper dielectric layer is preferably 15~25 μm.

In forming the isolation wall by using the unleaded non-alkali glass composition as a dielectric material, the thickness of the upper dielectric layer is preferably 80~200 μm.

The thickness of each composition of the PDP can be suitably adjusted within the range proposed through the transition point, the thermal expansion coefficient, the dielectric constant, and the like.

In addition, as known from the experiment results of the embodiments of the various glass compositions, the low melting point unleaded non-alkali glass composition without containing Pb and alkali oxide can be formed.

As so far described, a composition of glass for PDP and its fabrication method of the present invention have the following advantages.

That is, first, by composing the $ZnO$—$B_2O_3$ group and alkaline earth metal oxide, an environment-friendly glass composition can be fabricated.

Second, the glass composition comprising the $ZnO$—$B_2O_3$ group and alkaline earth metal oxide can be used as various PDP dielectric materials. The dielectric formed with the glass composition exhibits an improved discharge efficiency.

Third, by composing the $ZnO$—$B_2O_3$ group and alkaline earth metal oxide, the low melting point unleaded non-alkali glass composition can be fabricated at a low cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A dielectric material of a PDP comprising:
   a glass composition and a ceramic filler, wherein the glass composition comprising 10~40 mol % of ZnO and $B_2O_3$ having a ratio of 0.5~1.5, 10~25 mol % of alkaline earth metal oxide, and 1 to less than 3.2 mol % and greater than 7.5 mol % to less than or equal to 15 mol % of $Bi_2O_3$, wherein the alkaline earth metal oxide is at least one of BaO, CaO, SrO and MgO, or their mixture and an additive comprising 10 mol % or less, the additive being at least one of $La_2O_3$, $Al_2O_3$, $SiO_2$, or their mixture.

2. The dielectric material of claim 1 wherein the ceramic filler is $TiO_2$ or $Al_2O_3$.

3. The dielectric material of claim 1, wherein the glass composition is mixed to $TiO_2$ or $Al_2O_3$ and formed as an unleaded non-alkali isolation wall dielectric or an unleaded non-alkali lower dielectric.

4. The dielectric material of claim 1, wherein the glass composition is included in an isolation wall, an upper dielectric layer, a lower dielectric layer and a seal material of the PDP.

5. A method for fabricating a glass composition of a PDP, comprising:
   mixing 10 mol % or less additive. 10~40 mol % of ZnO, 10~40 mol % $B_2O_3$, 10~25 mol % of alkaline earth metal oxide and 1 to less than 3.2 mol % and greater than 7.5 mol % to less than or equal to 15 mol % of $Bi_2O_3$, wherein a ratio of ZnO and $B_2O_3$ is 0.5~1.5; the additive is at least one of $La_2O_3$, $Al_2O_3$, $SiO_2$ or their mixture, and the alkaline earth metal oxide is at least one of BaO, CaO, SrO and MgO, or their mixture; and
   melting the mixture at a high temperature, quenching the melted component to form a glass flake, milling the glass flake to form unleaded non-alkali glass powder.

6. The method of claim 5, wherein the unleaded non-alkali glass powder has a particle diameter of 1~4 μm.

7. The method of claim 5, wherein the unleaded non-alkali glass powder is contained in each composition of an isolation wall, an upper dielectric, a lower dielectric and a seal material of the PDP.

8. A glass composition of a PDP comprising:
   10~40 mol % of ZnO and $B_2O_3$ having a ratio of 0.5~1.5;
   10~25 mol % of alkaline earth metal oxide, wherein the alkaline earth metal oxide is at least one of BaO, CaO, SrO and MgO, or their mixture;
   1 to less than 3.2 mol % and greater than 7.5 mol % to less than or equal to 15 mol % of $Bi_2O_3$; and
   10 mol % or less additive, wherein the additive is a mixture of $La_2O_3$, $Al_2O_3$, $SiO_2$.

9. The composition of claim 8 is mixed to a ceramic filler and formed as an unleaded non-alkali isolation wall dielectric or an unleaded non-alkali lower dielectric, and the ceramic filler is $TiO_2$ or $Al_2O_3$.

10. A dielectric composition of a PDP comprising:
    10~40 mol % of ZnO;
    10~40 mol % of $B_2O_3$, wherein a ratio of ZnO and $B_2O_3$ is 0.5~1.5;
    10~25 mol % of alkaline earth metal oxide, wherein the alkaline earth metal oxide is at least one of BaO, GaO, SrO and MgO or their mixture;
    1 to less than 3.2 mol % and greater than 7.5 mol % to less than or equal to 15 mol % of $Bi_2O_3$; and
    10 mol % or less additive, wherein the additive is at least one of $La_2O_3$, $Al_2O_3$ and $SiO_2$, or their mixture;
    wherein the dielectric composition is included in an upper dielectric layer with dielectric constants ranging between 8-13 and transition points ranging between 480~550° C., and wherein the dielectric composition is mixed to a ceramic filler and formed as an unleaded non-alkali isolation wall dielectric or an unleaded non-alkali lower dielectric, and the ceramic filler is $TiO_2$ or $Al_2O_3$.

* * * * *